United States Patent
Kolich et al.

(10) Patent No.: US 9,663,000 B2
(45) Date of Patent: May 30, 2017

(54) VEHICLE SEAT CONFIGURED TO IMPROVE ACCESS

(71) Applicant: Ford Global Technologies, LLC, Dearborn, MI (US)

(72) Inventors: Michael Kolich, Windsor (CA); Amber LaVerne Hall, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 14/598,410

(22) Filed: Jan. 16, 2015

(65) Prior Publication Data
US 2016/0207423 A1    Jul. 21, 2016

(51) Int. Cl.
*B60N 2/02*       (2006.01)
*B60N 2/06*       (2006.01)
(Continued)

(52) U.S. Cl.
CPC ............ *B60N 2/0252* (2013.01); *B60N 2/06* (2013.01); *B60N 2/16* (2013.01); *B60N 2/002* (2013.01);
(Continued)

(58) Field of Classification Search
CPC .. B60N 2/0224; B60N 2/0248; B60N 2/0252; B60N 2002/0256; B60N 2002/026;
(Continued)

(56) References Cited

U.S. PATENT DOCUMENTS

| 2,958,369 A | 11/1960 | Pitts et al. | |
|---|---|---|---|
| 2,974,998 A * | 3/1961 | Himka | B60N 2/0224 296/68 |

(Continued)

FOREIGN PATENT DOCUMENTS

| DE | 102004037069 | 4/2005 | |
|---|---|---|---|
| DE | 102007003284 A1 * | 7/2008 | ............. B60N 2/449 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — Thomas G Black
*Assistant Examiner* — Sara Lewandroski
(74) *Attorney, Agent, or Firm* — Vichit Chea; Price Heneveld LLP (57) ABSTRACT

The present invention includes a vehicle seat having a seat portion and a seatback. The vehicle seat further includes a plurality of air bladders disposed in the seat portion and a plurality of air bladders disposed in the seatback. The air bladders are configurable between fully inflated condition, fully deflated condition, and plurality of semi-inflated conditions. A controller is configured to control air bladder inflation, wherein the air bladders deflate to the fully deflated condition in response to an access signal received by the controller. The controller is further configured to control the seat position with regards to vertical and horizontal positions to provide greater access to the vehicle interior when entering or exiting the vehicle.

11 Claims, 7 Drawing Sheets

(51) Int. Cl.
*B60N 2/16* (2006.01)
*B60R 16/037* (2006.01)
*B60N 2/00* (2006.01)

(52) U.S. Cl.
CPC .......... *B60N 2/02* (2013.01); *B60N 2002/026* (2013.01); *B60N 2002/0256* (2013.01); *B60R 16/037* (2013.01)

(58) Field of Classification Search
CPC . B60N 2/02; B60N 2/04; B60N 2/045; B60N 2/06; B60N 2/0228; B60N 2/0232; B60N 2/0244; B60N 2/0296; B60N 2/00; B60N 2/002; B60N 2002/0204; B60N 2002/0212; B60N 2002/0268; B60N 2002/0272; B60R 2011/008; B60W 50/08; B60W 50/085; B60W 50/0098
See application file for complete search history.

(56) References Cited

U.S. PATENT DOCUMENTS

| | | |
|---|---|---|
| 3,403,938 A | 10/1968 | Cramer et al. |
| 3,929,374 A | 12/1975 | Hogan et al. |
| 4,324,431 A | 4/1982 | Murphy et al. |
| 4,334,709 A | 6/1982 | Akiyama et al. |
| 4,353,595 A | 10/1982 | Kaneko et al. |
| 4,541,669 A | 9/1985 | Goldner |
| 4,629,248 A | 12/1986 | Mawbey |
| 4,629,253 A | 12/1986 | Williams |
| 4,720,141 A | 1/1988 | Sakamoto et al. |
| 4,915,447 A | 4/1990 | Shovar |
| 5,096,529 A | 3/1992 | Baker |
| 5,171,062 A | 12/1992 | Courtois |
| 5,174,526 A | 12/1992 | Kanigowski |
| 5,518,294 A | 5/1996 | Ligon, Sr. et al. |
| 5,560,681 A | 10/1996 | Dixon et al. |
| 5,647,635 A | 7/1997 | Aumond et al. |
| 5,755,493 A | 5/1998 | Kodaverdian |
| 5,769,489 A | 6/1998 | Dellanno |
| 5,826,938 A | 10/1998 | Yanase et al. |
| 5,836,648 A | 11/1998 | Karschin et al. |
| 5,902,014 A | 5/1999 | Dinkel et al. |
| 5,913,568 A | 6/1999 | Brightbill et al. |
| 5,951,039 A | 9/1999 | Severinski et al. |
| 5,975,629 A | 11/1999 | Lorbiecki |
| 6,024,406 A | 2/2000 | Charras et al. |
| 6,062,642 A | 5/2000 | Sinnhuber et al. |
| 6,068,339 A | 5/2000 | Linzalone |
| 6,088,642 A * | 7/2000 | Finkelstein ............ B60N 2/002 297/284.1 |
| 6,145,925 A | 11/2000 | Eksin et al. |
| 6,155,593 A | 12/2000 | Kimura et al. |
| 6,179,379 B1 | 1/2001 | Andersson |
| 6,189,966 B1 | 2/2001 | Faust et al. |
| 6,196,627 B1 | 3/2001 | Faust et al. |
| 6,203,105 B1 | 3/2001 | Rhodes, Jr. |
| 6,206,466 B1 | 3/2001 | Komatsu |
| 6,217,062 B1 | 4/2001 | Breyvogel et al. |
| 6,220,661 B1 | 4/2001 | Peterson |
| 6,224,150 B1 | 5/2001 | Eksin et al. |
| 6,296,308 B1 | 10/2001 | Cosentino et al. |
| 6,312,050 B1 | 11/2001 | Eklind |
| 6,364,414 B1 | 4/2002 | Specht |
| 6,375,269 B1 | 4/2002 | Maeda et al. |
| 6,394,546 B1 | 5/2002 | Knoblock et al. |
| 6,454,353 B1 | 9/2002 | Knaus |
| 6,523,892 B1 | 2/2003 | Kage et al. |
| 6,550,856 B1 | 4/2003 | Ganser et al. |
| 6,565,150 B2 | 5/2003 | Fischer et al. |
| 6,619,605 B2 | 9/2003 | Lambert |
| 6,682,140 B2 | 1/2004 | Minuth et al. |
| 6,695,406 B2 | 2/2004 | Plant |
| 6,698,832 B2 | 3/2004 | Boudinot |
| 6,736,452 B2 | 5/2004 | Aoki et al. |
| 6,758,522 B2 | 7/2004 | Ligon, Sr. et al. |
| 6,808,230 B2 | 10/2004 | Buss et al. |
| 6,824,212 B2 | 11/2004 | Malsch et al. |
| 6,848,742 B1 | 2/2005 | Aoki et al. |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,938,953 B2 | 9/2005 | Håland et al. |
| 6,955,399 B2 | 10/2005 | Hong |
| 6,962,392 B2 | 11/2005 | O'Connor |
| 6,988,770 B2 | 1/2006 | Witchie |
| 6,997,473 B2 | 2/2006 | Tanase et al. |
| 7,040,699 B2 | 5/2006 | Curran et al. |
| 7,100,992 B2 | 9/2006 | Bargheer et al. |
| 7,131,694 B1 | 11/2006 | Buffa |
| 7,152,920 B2 | 12/2006 | Sugiyama et al. |
| 7,159,934 B2 | 1/2007 | Farquhar et al. |
| 7,185,950 B2 | 3/2007 | Pettersson et al. |
| 7,213,876 B2 | 5/2007 | Stoewe |
| 7,229,118 B2 | 6/2007 | Saberan et al. |
| 7,261,371 B2 | 8/2007 | Thunissen et al. |
| 7,311,681 B1 | 12/2007 | Vaccarella |
| 7,344,189 B2 | 3/2008 | Reed et al. |
| 7,350,859 B2 | 4/2008 | Klukowski |
| 7,393,005 B2 | 7/2008 | Inazu et al. |
| 7,425,034 B2 | 9/2008 | Bajic et al. |
| 7,441,838 B2 | 10/2008 | Patwardhan |
| 7,467,823 B2 | 12/2008 | Hartwich |
| 7,478,869 B2 | 1/2009 | Lazanja et al. |
| 7,481,489 B2 | 1/2009 | Demick |
| 7,506,924 B2 | 3/2009 | Bargheer et al. |
| 7,506,938 B2 | 3/2009 | Brennan et al. |
| 7,530,633 B2 | 5/2009 | Yokota et al. |
| 7,543,888 B2 | 6/2009 | Kuno |
| 7,578,552 B2 | 8/2009 | Bajic et al. |
| 7,597,398 B2 | 10/2009 | Lindsay |
| 7,614,693 B2 | 11/2009 | Ito |
| 7,641,281 B2 | 1/2010 | Grimm |
| 7,669,925 B2 | 3/2010 | Beck et al. |
| 7,669,928 B2 | 3/2010 | Snyder |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,752,720 B2 | 7/2010 | Smith |
| 7,753,451 B2 | 7/2010 | Maebert et al. |
| 7,775,602 B2 | 8/2010 | Lazanja et al. |
| 7,784,863 B2 | 8/2010 | Fallen |
| 7,802,843 B2 | 9/2010 | Andersson et al. |
| 7,815,219 B2 * | 10/2010 | Breed ................... B60N 2/002 180/273 |
| 7,819,470 B2 | 10/2010 | Humer et al. |
| 7,823,971 B2 | 11/2010 | Humer et al. |
| 7,845,729 B2 | 12/2010 | Yamada et al. |
| 7,857,381 B2 | 12/2010 | Humer et al. |
| 7,871,126 B2 | 1/2011 | Becker et al. |
| 7,891,701 B2 | 2/2011 | Tracht et al. |
| 7,909,360 B2 | 3/2011 | Marriott et al. |
| 7,931,294 B2 | 4/2011 | Okada et al. |
| 7,931,330 B2 | 4/2011 | Itou et al. |
| 7,946,649 B2 | 5/2011 | Galbreath et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,971,931 B2 | 7/2011 | Lazanja et al. |
| 7,971,937 B2 | 7/2011 | Ishii et al. |
| 8,011,726 B2 | 9/2011 | Omori et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,075,053 B2 | 12/2011 | Tracht et al. |
| 8,109,569 B2 | 2/2012 | Mitchell |
| 8,123,246 B2 | 2/2012 | Gilbert et al. |
| 8,128,167 B2 | 3/2012 | Zhong et al. |
| 8,162,391 B2 | 4/2012 | Lazanja et al. |
| 8,162,397 B2 | 4/2012 | Booth et al. |
| 8,167,370 B2 | 5/2012 | Arakawa et al. |

(56) References Cited

U.S. PATENT DOCUMENTS

| | | | |
|---|---|---|---|
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,165 B2 | 7/2012 | Mizoi | |
| 8,342,607 B2 | 1/2013 | Hofmann et al. | |
| 2002/0145512 A1 | 10/2002 | Sleichter, III et al. | |
| 2003/0038221 A1* | 2/2003 | Fu | B60N 2/0228 248/421 |
| 2003/0038517 A1 | 2/2003 | Moran et al. | |
| 2004/0195870 A1 | 10/2004 | Bohlender et al. | |
| 2005/0200166 A1 | 9/2005 | Noh | |
| 2005/0218633 A1* | 10/2005 | Levine | B60K 23/02 280/730.1 |
| 2005/0269810 A1* | 12/2005 | Breed | B60N 2/002 280/735 |
| 2006/0043777 A1 | 3/2006 | Friedman et al. | |
| 2006/0155429 A1 | 7/2006 | Boone et al. | |
| 2007/0118259 A1 | 5/2007 | Chernoff et al. | |
| 2007/0120401 A1 | 5/2007 | Minuth et al. | |
| 2007/0246285 A1* | 10/2007 | Browne | B60R 7/043 180/273 |
| 2008/0174159 A1 | 7/2008 | Kojima et al. | |
| 2009/0066122 A1 | 3/2009 | Minuth et al. | |
| 2009/0165263 A1 | 7/2009 | Smith | |
| 2009/0322124 A1 | 12/2009 | Barkow et al. | |
| 2010/0038937 A1 | 2/2010 | Andersson et al. | |
| 2010/0140986 A1 | 6/2010 | Sawada | |
| 2010/0171346 A1 | 7/2010 | Laframboise et al. | |
| 2010/0187881 A1 | 7/2010 | Fujita et al. | |
| 2010/0201167 A1 | 8/2010 | Wieclawski | |
| 2010/0231013 A1 | 9/2010 | Schlenker | |
| 2010/0270840 A1 | 10/2010 | Tanaka et al. | |
| 2010/0286867 A1 | 11/2010 | Bergholz et al. | |
| 2010/0301650 A1 | 12/2010 | Hong | |
| 2010/0320816 A1 | 12/2010 | Michalak | |
| 2011/0018498 A1 | 1/2011 | Soar | |
| 2011/0055720 A1 | 3/2011 | Potter et al. | |
| 2011/0074185 A1 | 3/2011 | Nakaya et al. | |
| 2011/0095513 A1 | 4/2011 | Tracht et al. | |
| 2011/0095578 A1 | 4/2011 | Festag | |
| 2011/0109127 A1 | 5/2011 | Park et al. | |
| 2011/0109128 A1 | 5/2011 | Axakov et al. | |
| 2011/0121624 A1 | 5/2011 | Brncick et al. | |
| 2011/0133525 A1 | 6/2011 | Oota | |
| 2011/0163574 A1 | 7/2011 | Tame et al. | |
| 2011/0163583 A1 | 7/2011 | Zhong et al. | |
| 2011/0186560 A1 | 8/2011 | Kennedy et al. | |
| 2011/0187174 A1 | 8/2011 | Tscherbner | |
| 2011/0254335 A1 | 10/2011 | Pradier et al. | |
| 2011/0260506 A1 | 10/2011 | Kuno | |
| 2011/0272548 A1 | 11/2011 | Rudkowski et al. | |
| 2011/0272978 A1 | 11/2011 | Nitsuma | |
| 2011/0278885 A1 | 11/2011 | Procter et al. | |
| 2011/0278886 A1 | 11/2011 | Nitsuma | |
| 2011/0298261 A1 | 12/2011 | Holt et al. | |
| 2012/0007401 A1* | 1/2012 | Hashimoto | B60N 2/0232 297/344.13 |
| 2012/0032478 A1 | 2/2012 | Friderich et al. | |
| 2012/0032486 A1 | 2/2012 | Baker et al. | |
| 2012/0037754 A1 | 2/2012 | Kladde | |
| 2012/0063081 A1 | 3/2012 | Grunwald | |
| 2012/0080914 A1 | 4/2012 | Wang | |
| 2012/0086249 A1* | 4/2012 | Hotary | B60N 2/0228 297/284.3 |
| 2012/0091695 A1 | 4/2012 | Richez et al. | |
| 2012/0091766 A1 | 4/2012 | Yamaki et al. | |
| 2012/0091779 A1 | 4/2012 | Chang et al. | |
| 2012/0109468 A1 | 5/2012 | Baumann et al. | |
| 2012/0119551 A1 | 5/2012 | Brncick et al. | |
| 2012/0125959 A1 | 5/2012 | Kucera | |
| 2012/0127643 A1 | 5/2012 | Mitchell | |
| 2012/0129440 A1 | 5/2012 | Kitaguchi et al. | |
| 2012/0162891 A1 | 6/2012 | Tranchina et al. | |
| 2012/0175924 A1 | 7/2012 | Festag et al. | |
| 2012/0187729 A1 | 7/2012 | Fukawatase et al. | |
| 2012/0248833 A1 | 10/2012 | Hontz et al. | |
| 2012/0261974 A1 | 10/2012 | Yoshizawa et al. | |
| 2013/0076092 A1 | 3/2013 | Kulkarni et al. | |
| 2014/0032043 A1 | 1/2014 | Line et al. | |

FOREIGN PATENT DOCUMENTS

| | | |
|---|---|---|
| EP | 0754590 | 1/1997 |
| EP | 0926969 | 1/2002 |
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| EP | 1839932 | 12/2010 |
| EP | 2289732 | 3/2011 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |
| WO | 2014047417 | 3/2014 |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

* cited by examiner

VEHICLE SEAT CONFIGURED TO IMPROVE ACCESS

FIELD OF THE INVENTION

The present invention generally relates to a vehicle seat having multiple configuration and support settings, and more particularly, to a vehicle seat configured to automatically move to an access position to facilitate ingress and egress from a vehicle interior in which the vehicle seat is disposed. This object of the present invention is further achieved by way of the method described herein.

BACKGROUND OF THE INVENTION

It is generally known to equip seats in motor vehicles with various support functions, for example for the lumbar supports and the actual seating surface. However, it can be problematic for a vehicle occupant to gain access to or exit a vehicle interior once customized seat positions and support settings have been selected. In such situations, it is usually necessary to manually maneuver a vehicle seat within the vehicle interior to provide greater access, thereby losing any customized setting. Known systems for moving a vehicle seat and controlling vehicle seat support settings involve a number of different system executions to provide desired access to the vehicle seat and vehicle interior. Thus, a system which automatically provides for a seat position that provides greater access when needed is desired.

SUMMARY OF THE INVENTION

One aspect of the present invention includes a vehicle seat having a track assembly and a seat height adjustment mechanism coupled thereto. A plurality of air bladders is disposed in the vehicle seat. A controller is configured to control inflation of the air bladders and a seat position. The air bladders are configured to deflate to a fully deflated condition and the vehicle seat moves to a rearward-most and lower-most position in response to an access signal received by the controller.

Another aspect of the present invention includes a vehicle seat configuration system having a vehicle seat operable between a support condition and an access condition. The support condition includes a first vertical position and a first horizontal position, while the access condition includes a second vertical position and a second horizontal position. The second vertical position is spaced downwardly from the first vertical position, and the second horizontal position is spaced rearwardly from the first horizontal position. The vehicle seat configuration system further includes a plurality of air bladders disposed in the vehicle seat. The air bladders are configured to deflate when the vehicle seat is in the access condition. The vehicle seat configuration system further includes a controller configured to move the vehicle seat to the access condition from the support condition in response to an access signal.

Yet another aspect of the present invention includes a vehicle seat having a seat portion and a seatback. The vehicle seat further includes a plurality of air bladders disposed in the seat portion. The air bladders are configurable between a fully inflated condition, a fully deflated condition, and a plurality of semi-inflated conditions therebetween. A controller is configured to control air bladder inflation, wherein the air bladders deflate to the fully deflated condition in response to an access signal received by the controller.

These and other aspects, objects, and features of the present invention will be understood and appreciated by those skilled in the art upon studying the following specification, claims, and appended drawings.

DETAILED DESCRIPTION OF EMBODIMENTS

Figure 1A:
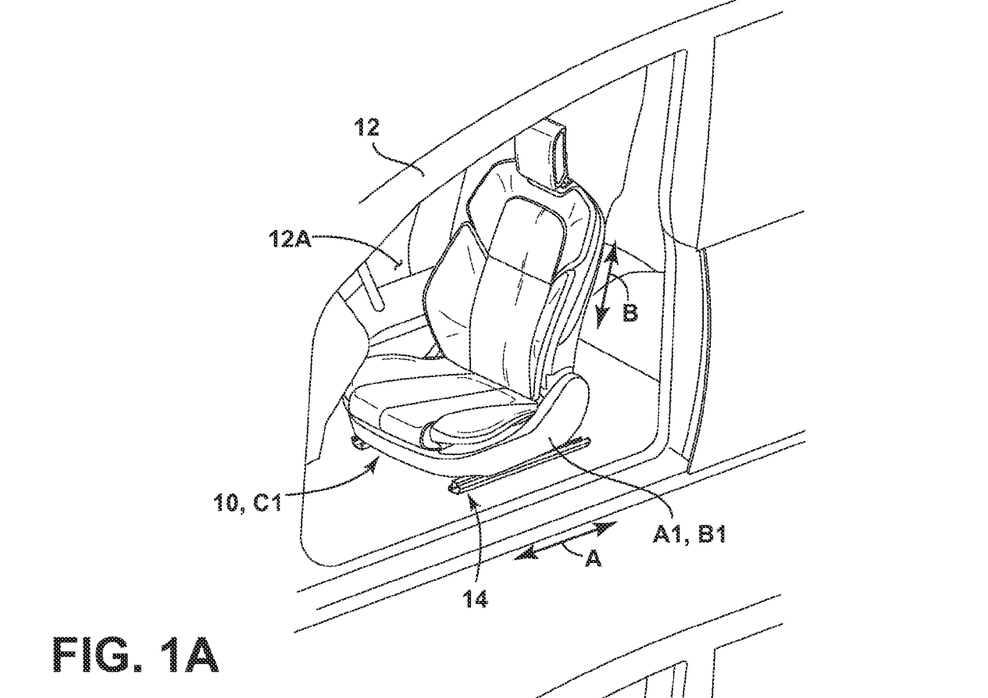
FIG. 1A is a perspective view of vehicle seat disposed in an interior of a vehicle in a first position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1B:
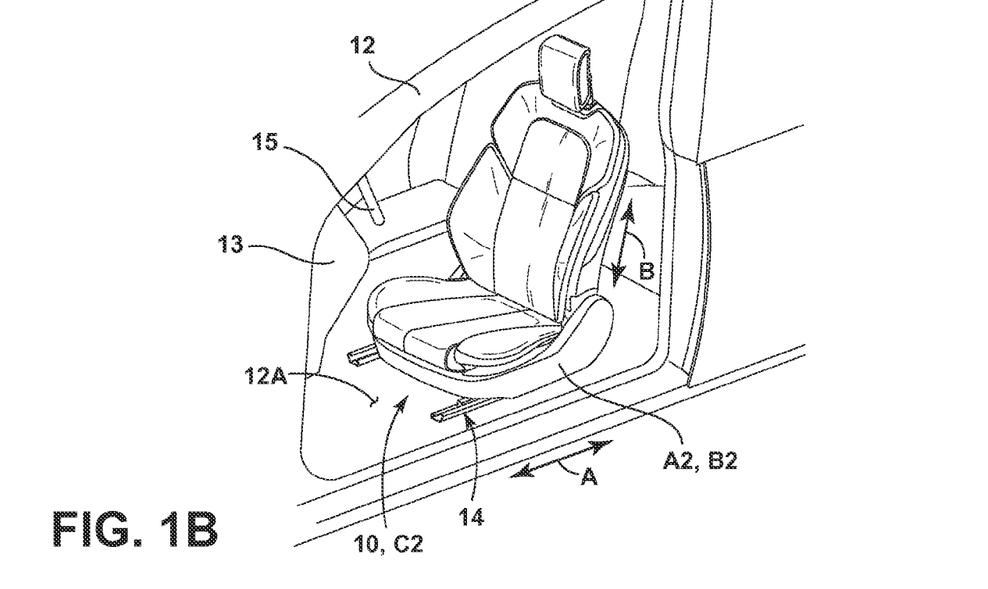
FIG. 1B is a perspective view of the vehicle seat of FIG. 1A disposed in the interior of the vehicle in a second position.

Referring now to FIGS. 1A and 1B, a vehicle seat 10 is shown disposed in a vehicle 12 within the vehicle interior 12A and laterally adjacent to an instrument panel or dashboard 13. In FIGS. 1A and 1B, the vehicle seat 10 is specifically disposed in the vehicle interior 12A on a driver's side seating area, however, it is contemplated that the vehicle seat 10 could be disposed in other areas of the vehicle interior 12A, such as the passenger side seating area. The vehicle seat 10 is shown disposed on a track assembly 14 which is configured to move the vehicle seat 10 between fore and aft positions in a direction as indicated by arrow A. The vehicle seat 10 is further configured to move vertically, along a path as indicated by arrow B, to raise and lower the vehicle seat 10 while coupled to the track assembly 14. With specific reference to FIG. 1A, the vehicle seat 10 is shown in a first position C1 which, as discussed below, will be referred to as a support condition which can be customized by the vehicle occupant. In the support condition C1, the vehicle seat 10 is contemplated to be specifically tailored, with respect to its position and comfort setting, to the support needs of a specific vehicle occupant. In FIG. 1A, the vehicle seat 10 is shown in a first generally central fore and aft setting A1 along track assembly 14, thereby defining a first horizontal position A1. As further shown in FIG. 1A, the vehicle seat 10 is at a customized first height setting B1 along the vertical path as indicated by arrow B, thereby defining a first vertical position B1.

With specific reference to FIG. 1B, the vehicle seat 10 is shown in a second position C2 which, as discussed below, will be referred to as an access condition. In the access condition C2, the vehicle seat 10 is contemplated to have moved from the specifically tailored support condition C1, with fore and aft setting A1 and height setting B1, to a lowered and rearward-most access condition C2. Thus, as shown from FIG. 1A to FIG. 1B, the vehicle seat 10 has moved from the generally central first horizontal position A1, to a second horizontal position A2 along track assembly 14, which is also a rearward-most position. As further shown from FIG. 1A to FIG. 1B, the vehicle seat 10 has also moved vertically from the customized first vertical position B1, to a lower-most setting in second vertical position B2 along the vertical path as indicated by arrow B. In the access condition C2, as compared to the support condition C1, the vehicle occupant can more easily enter or exit the vehicle 12. This is due largely in part by the vehicle seat 10 having moved vertically downward and horizontally rearward away from the instrument panel 13 from which a steering wheel 15 outwardly extends in a car-rearward direction into the vehicle interior 12A. Thus, as shown in the access condition C2 of FIG. 1B, a vehicle occupant is given greater access, or less encumbered access, to the vehicle seat 10 to facilitate ingress and egress from the vehicle interior 12A. Thus, the second vertical position B2 (FIG. 1B) is spaced downwardly relative to the first vertical position B1 (FIG. 1A), and the second horizontal position A2 (FIG. 1B) is spaced rearwardly from the first horizontal position A1 (FIG. 1A).

Figure 2:
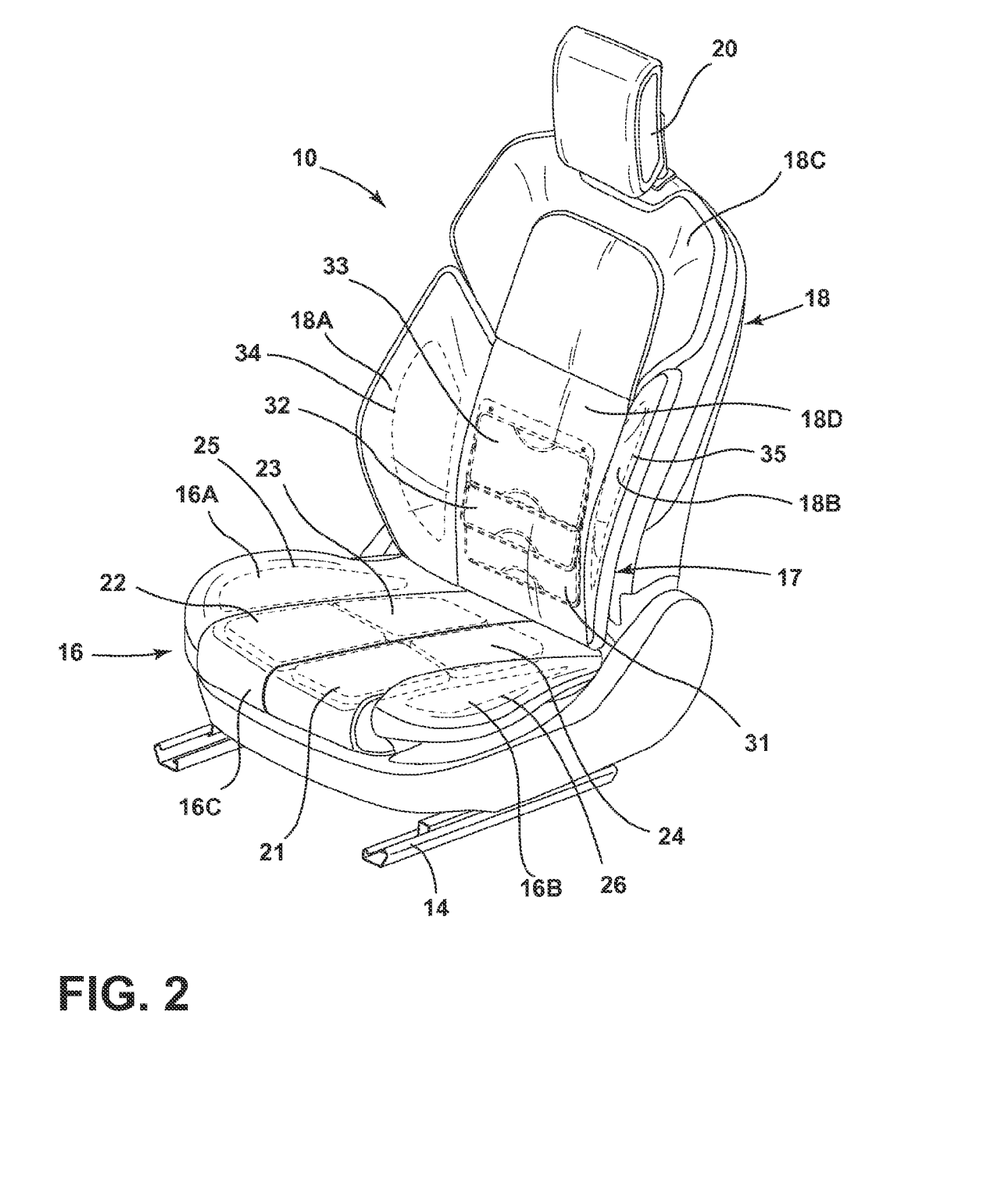
FIG. 2 is a perspective view of the vehicle seat of FIG. 1A removed from the vehicle interior and having a plurality of air bladders disposed therein.

Referring now to FIG. 2, the vehicle seat 10 is shown removed from the vehicle interior 12A (FIG. 1A). The vehicle seat 10 generally includes a substantially horizontal seat portion 16 and a seatback 18 having a headrest assembly 20 disposed on an upper portion thereof. It is contemplated that the seatback 18 is a pivoting member configured for pivotal movement relative to the seat portion 16. The seat portion 16 includes a central portion 16C having protruding fins 16A, 16B on opposite sides thereof. The protruding fins 16A, 16B are generally disposed at an inward angle towards the central portion 16C of the seat portion 16 and are configured to provide support for a vehicle occupant while the vehicle 12 (FIG. 1A) is in motion. Similarly, the seatback 18 includes protruding fins 18A, 18B and an upper collar portion 18C which are also configured to support a vehicle occupant and are generally angled towards a central portion 18D of the seatback 18. In FIG. 2, the vehicle seat 10 is shown having a cover 17 which is contemplated to be comprised of a suitable natural or synthetic material, or any combination thereof, used to generally cover or upholster the vehicle seat 10. As shown in phantom in FIG. 2, the vehicle seat 10 includes a series of air bladders 21-24 disposed in central portion 16C of the seat portion 16, as well as a series of air bladders 31-33 disposed in the central portion 18D of the seatback 18. Further, air bladders 25, 26 are also shown disposed in protruding fins 16A, 16B of seat portion 16, and air bladders 34, 35 are shown disposed in protruding fins 18A, 18B of seatback 18. The air bladders 21-26, 31-35 are configured to fill with air to a desired level in response to an input by a vehicle occupant relative to a select comfort setting chosen by the vehicle occupant. In this way, the air bladders 21-26, 31-35 are configured to selectively inflate or deflate relative to a specific comfort setting selected by the vehicle occupant to provide a customized support setting.

Figure 3A:
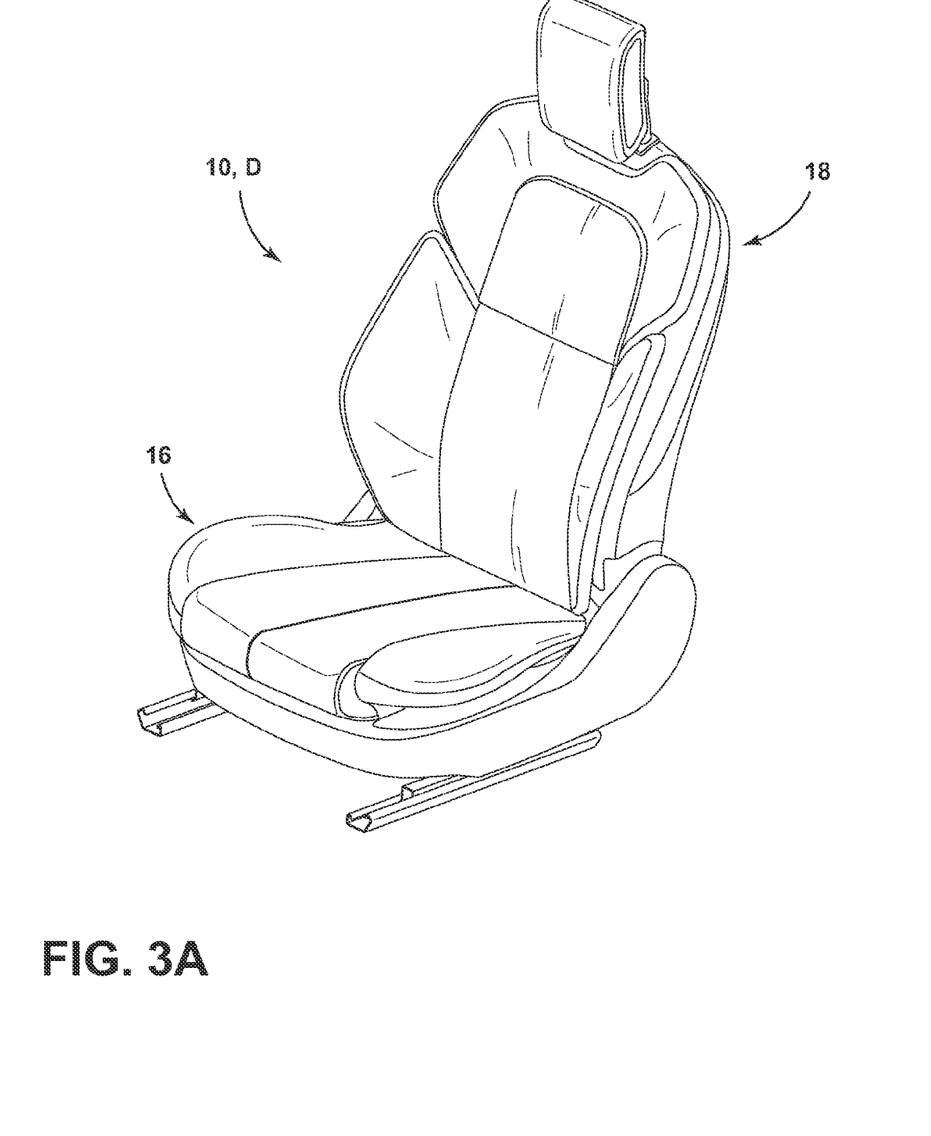
FIGS. 3A-3C are perspective views of the vehicle seat of FIG. 2 shown at various inflation level settings.
Figure 3B:
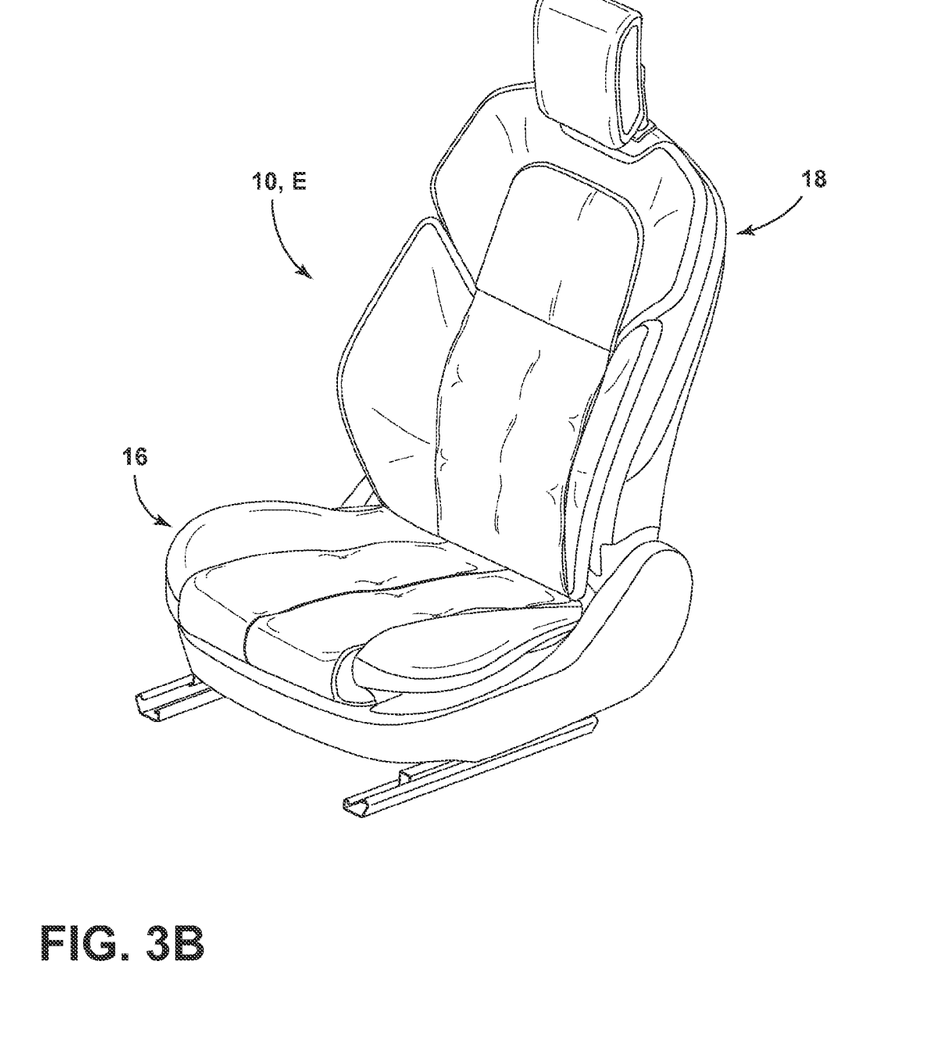
Figure 3C:
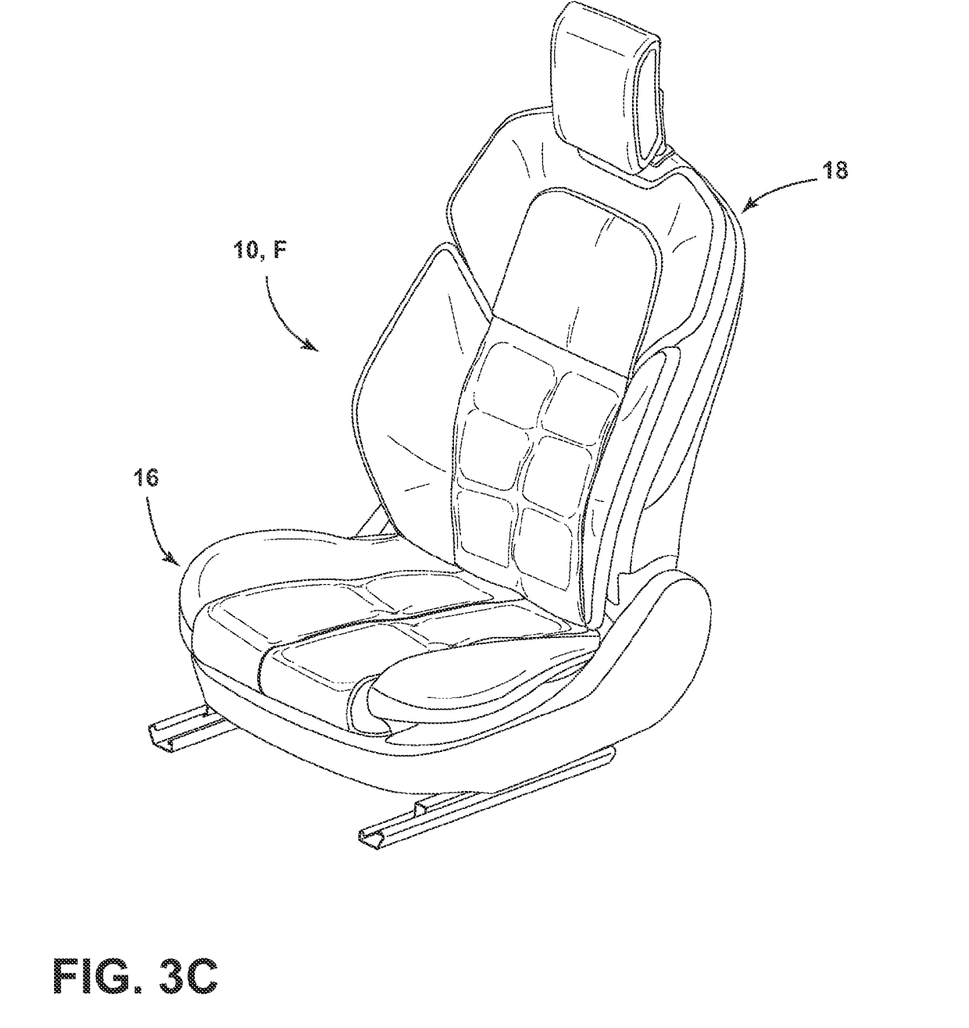

Referring now to FIGS. 3A-3C, the vehicle seat 10 is shown in a deflated or unfilled condition D (FIG. 3A), a semi-inflated condition E (FIG. 3B), and a fully inflated condition F (FIG. 3C). In the fully inflated condition F (FIG. 3C), the air bladders 21-26, 31-35 have been filled to a maximum capacity to provide firm support for a vehicle occupant. In the semi-inflated condition E (FIG. 3B), the air bladders 21-26, 31-35 have been semi-filled with air to provide a customized cushioned support for a vehicle occupant. In the fully deflated or unfilled condition D shown in FIG. 3A, the vehicle seat 10 is generally supported by a cushion material disposed in the seat portion 16 and the seatback 18, over which the air bladders 21-26, 31-35 generally reside. While the air bladders 21-26, 31-35 are covered by cover 17 (FIG. 2) in FIGS. 3A-3C, their location is contemplated to be the same as shown in FIG. 2 and made apparent in FIGS. 3B and 3C as the air bladders 21-26, 31-35 inflate.

Referring again to FIG. 1A, the vehicle seat 10 is shown in the customized support condition C1 with respect to the horizontal and vertical positions (A1 and B1) of the vehicle seat 10 within the vehicle interior 12A. It is further contemplated that the customized support condition C1 will also include any one of the air bladder settings D-F, shown in FIGS. 3A-3C. Thus, in order to facilitate ingress and egress to and from the vehicle interior 12A, it is contemplated that the vehicle seat 10 will release air from the air bladders 21-26, 31-35 to move the vehicle seat 10 towards the deflated or unfilled condition D shown in FIG. 3A. The changing of the air bladder condition to the deflated or unfilled condition D, shown in FIG. 3A, is contemplated to occur simultaneously with the vehicle seat 10 moving downward and rearward from the customized support condition C1, shown in FIG. 1A, to the access condition C2, shown in FIG. 1B. It is contemplated that the vehicle seat 10 will include a control system to automatically control the settings of the vehicle seat 10 for movement to the access condition C2 and for initiating a sequence to deflate the air bladders 21-26, 31-35, as further described below.

The air bladders 21-26, 31-35 are configured to move towards the deflated condition D (FIG. 3A) from either the customized semi-filled setting E (FIG. 3B) or the fully inflated setting F (FIG. 3C) when an input from the controller is received to move the air bladders 21-26, 31-35 towards the deflated condition D (FIG. 3A). Thus, the vehicle seat 10 shown in FIG. 2, includes a plurality of air bladders 21-26 disposed in the seat portion 16, and a plurality of air bladders 31-35 disposed in the seatback 18. It is contemplated that each air bladder 21-26 and 31-35 may be separately controlled with regards to inflation to provide a custom support setting for a vehicle occupant in the support condition C1. Further, it is contemplated that any one of the air bladders 21-26, 31-35 can be selected to remain inflated by a vehicle occupant using a programmable interface disposed in the vehicle 12 (FIG. 1A). The array of air bladders 21-26, 31-35 shown in FIG. 2 is exemplary only and may include more or fewer air bladders depending on the design of the vehicle seat 10.

Figure 4:
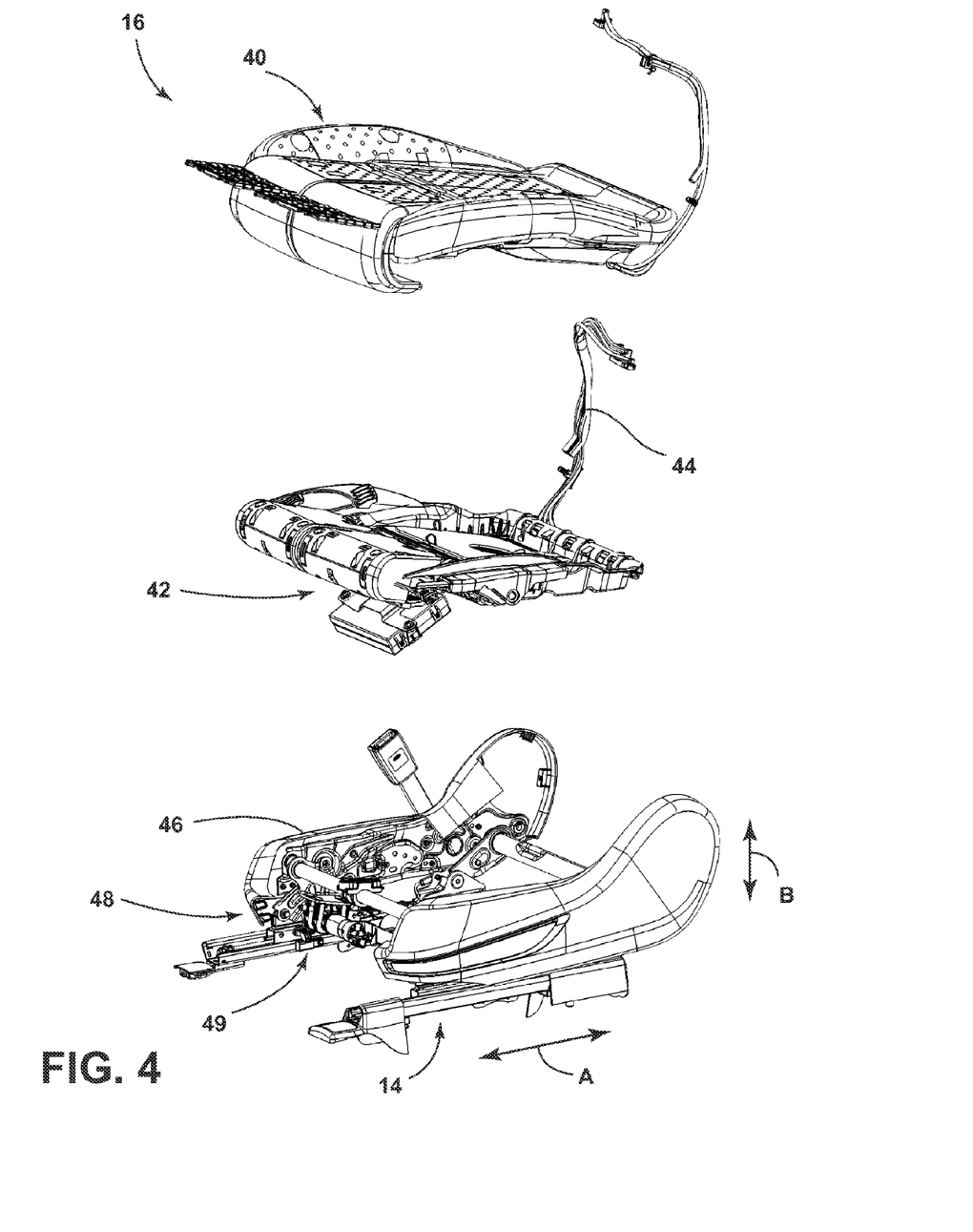
FIG. 4 is an exploded view of a seat portion of the vehicle seat of FIG. 2.

Referring now to FIG. 4, the seat portion 16 is shown having a cushion material 40 which generally supports the vehicle occupant in use. The air bladders 21-26 (FIG. 2) are generally disposed on the cushion material 40 and covered by the cover 17 (FIG. 2) in assembly. An inflation system 42 includes air passage ways 44 for inflating air bladders 31-35 to any one of the conditions D-F noted above. The inflation system 42 further includes air passage ways, not shown, for inflating air bladders 21-26 to any one of the conditions D-F noted above. The seat portion 16 further includes a frame 46 which is coupled to the track assembly 14 by a seat height adjustment mechanism 48. The seat height adjustment mechanism 48 is configured to adjust the vertical position of the vehicle seat 10 at the seat portion 16 along the path as indicated by arrow B between upper-most and lower-most positions and intermediate positions therebetween. A drive mechanism 49 is configured to adjust the horizontal position of the vehicle seat 10 along the track assembly 14 in a direction as indicated by arrow A.

Figure 5:
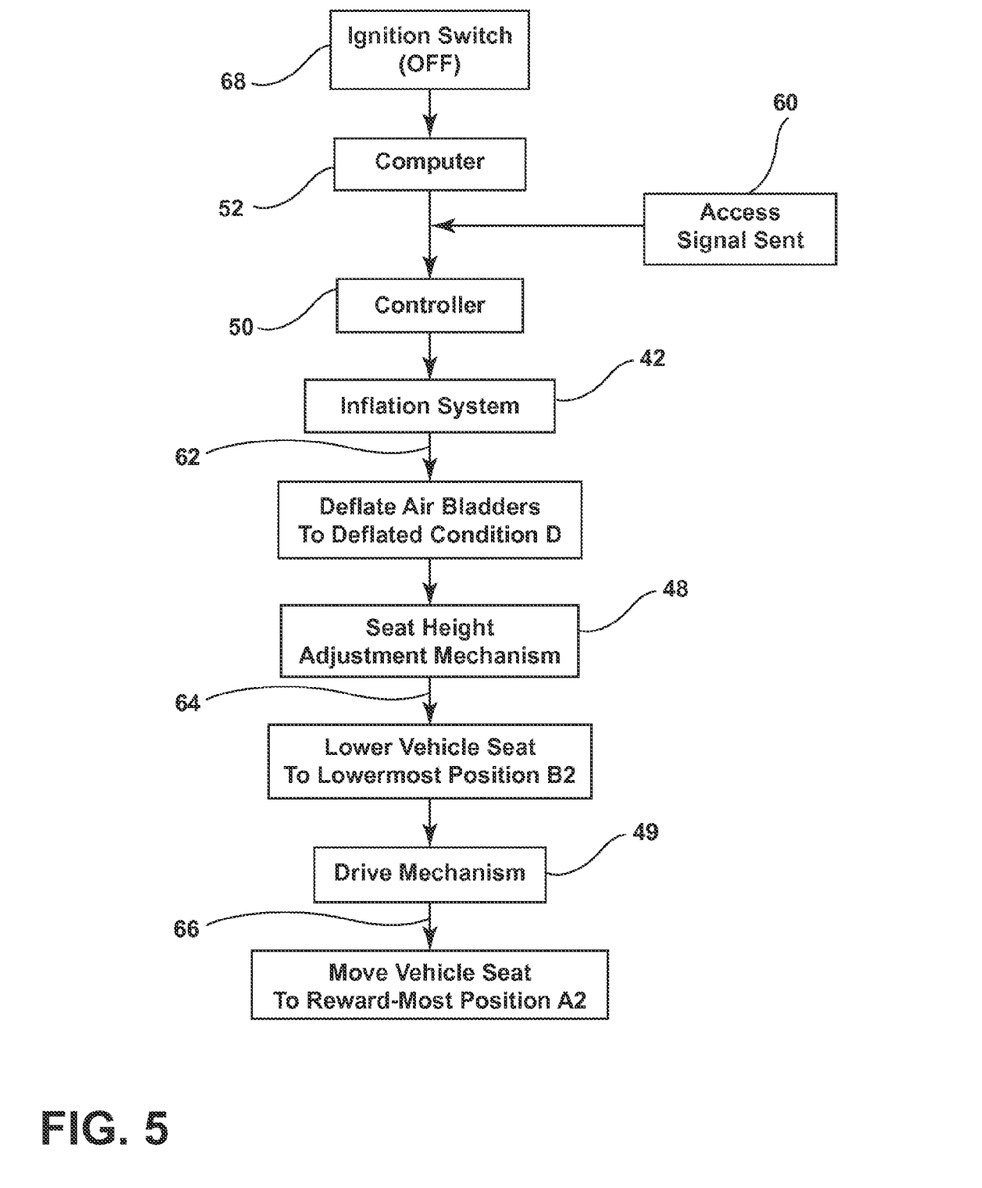
FIG. 5 illustrates a schematic flow diagram for controlling a seat position for a vehicle seat within a vehicle interior.

Referring now to FIG. 5, a schematic diagram is shown, wherein a controller 50 is operably coupled to the vehicle seat 10 for controlling the inflation system 42, the seat height adjustment mechanism 48, and the drive mechanism 49. It is further contemplated that separate controls will be accessible to the vehicle occupant for controlling these systems/mechanisms to get the vehicle seat 10 to the customized support condition C1 (FIG. 1A). The controller 50 is configured to receive electrical signals from a computer 52 disposed within the motor vehicle 12. One such signal, discussed herein as an access signal, may be used to trigger the controller 50 to move the vehicle seat 10 to the access condition C2 (FIG. 1B) from the support condition C1 (FIG. 1A). Thus, as shown in step 60 of FIG. 5, the computer 52 sends an access signal to the controller 50 which controls the inflation system 42. In step 62, the inflation system 42 will deflate the air bladders 21-26, 31-35 to the fully deflated condition D, shown in FIG. 3. As shown in step 64 of FIG. 5, the controller 50 will control the seat height adjustment mechanism 48 (FIG. 4) to move the vehicle seat 10 to the lower-most position B2 (FIG. 1B). Further, as shown in step 66 of FIG. 5, the controller 50 will control the drive mechanism 49 (FIG. 4) to move the vehicle seat 10 to the rearward-most position A2 (FIG. 1B). While indicated as separate steps in FIG. 5, it is contemplated that steps 62, 64 and 66 can occur simultaneously to quickly move the vehicle seat to the access condition C2 (FIG. 1B). Further, it is contemplated that the motor vehicle includes an ignition switch 68 which has various settings, such as ON and OFF conditions as well as an ACCESSORIES and a START conditions. The computer 52 may be programmed to provide the access signal to the controller 50 in a manner as described above with reference to step 60 of FIG. 5 when the ignition switch 68 is set to the OFF condition. Moving from the OFF condition to the ON condition, or any other setting of the ignition switch 68, can terminate the access signal or otherwise send a second signal to the controller 50, with which the ignition switch is interfaced, to return the vehicle seat 10 to the last support condition C1 programmed. The condition of the ignition switch 68 is one way for the controller 50 to receive the access signal, however, it is contemplated that any other manual or automatic trigger can be used to initiate the vehicle seat 10 moving to the access condition.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seat, comprising:
   a track assembly and a seat height adjustment mechanism coupled to the vehicle seat;
   a plurality of air bladders disposed in the vehicle seat, the plurality of air bladders being operable between fully deflated and customized support conditions;
   a controller configured to control inflation of the air bladders and a seat position; and
   wherein the air bladders deflate to the fully deflated condition from the customized support condition and the vehicle seat moves to a rearward-most and lower-most position in response to a single access signal received by the controller, and further wherein the air bladders inflate to the customized support condition when the access signal is terminated.

2. The vehicle seat of claim 1, wherein the vehicle seat includes a seat portion coupled to the track assembly and the seat height adjustment mechanism.

3. The vehicle seat of claim 2, wherein the vehicle seat includes a seatback operably coupled to the seat portion.

4. The vehicle seat of claim 3, wherein the plurality of air bladders includes a plurality of air bladders disposed in the seat portion.

5. The vehicle seat of claim 4, wherein the plurality of air bladders further includes a plurality of air bladders disposed in the seatback.

6. The vehicle seat of claim 5, wherein each air bladder of the plurality of air bladders disposed in the seat portion and the plurality of air bladders disposed in the seatback are further configurable between a fully inflated condition and a plurality of semi-inflated conditions.

7. The vehicle seat of claim 1, wherein the vehicle seat is disposed in a motor vehicle having an ignition switch interfaced with the controller, and further wherein the access signal is received by the controller when the ignition switch is in an off condition.

8. A vehicle seat configuration system, comprising:
 a vehicle seat operable between a support condition having a first vertical position and a first horizontal position, and an access condition having a second vertical position and a second horizontal position, wherein the second vertical position is spaced downwardly from the first vertical position, and further wherein the second horizontal position is spaced rearwardly from the first horizontal position;
 a plurality of air bladders disposed in the vehicle seat, wherein the air bladders are configured to deflate to a fully deflated condition from a customized semi-filled condition when the vehicle seat is in the access condition; and
 a controller configured to move the vehicle seat to the access condition from the support condition in response to a single access signal, and further wherein the controller is configured to inflate the air bladders to the customized semi-filled condition when the access signal is terminated.

9. The vehicle seat configuration system of claim 8, wherein the vehicle seat is disposed in a motor vehicle having an ignition switch interfaced with the controller, and further wherein the access signal is received by the controller when the ignition switch is in an off condition.

10. The vehicle seat configuration system of claim 8, wherein the plurality of air bladders is disposed in a seatback of the vehicle seat.

11. The vehicle seat configuration system of claim 10, wherein the plurality of air bladders is disposed in a seat portion of the vehicle seat.

\* \* \* \* \*